United States Patent

Bräu et al.

[11] Patent Number: 6,021,465
[45] Date of Patent: Feb. 1, 2000

[54] ARRANGEMENT FOR THE CONNECTING PERIPHERAL STORAGE DEVICES

[75] Inventors: Josef Bräu, München; Siegfried Kunz, Hohenlinden, both of Germany

[73] Assignee: Siemens Nixdorf Informationssysteme Aktiengesellschaft, Paderborn, Germany

[21] Appl. No.: 09/011,281
[22] PCT Filed: Jul. 24, 1996
[86] PCT No.: PCT/DE96/01365
  § 371 Date: Feb. 9, 1998
  § 102(e) Date: Feb. 9, 1998
[87] PCT Pub. No.: WO97/07464
  PCT Pub. Date: Feb. 27, 1997

[30] Foreign Application Priority Data

Aug. 11, 1995 [DE] Germany .......................... 195 29 628

[51] Int. Cl.⁷ .................................................. G06F 13/00
[52] U.S. Cl. ............................................................ 711/114
[58] Field of Search ...................... 364/DIG. 1 MS File, 364/DIG. 2 MS File; 709/200, 215, 226, 244, 251; 711/1, 100, 114, 115

[56] References Cited

U.S. PATENT DOCUMENTS

| | | | |
|---|---|---|---|
| 5,077,736 | 12/1991 | Dunphy, Jr. et al. | 714/7 |
| 5,544,339 | 8/1996 | Baba | 711/114 |
| 5,548,711 | 8/1996 | Brant et al. | 714/5 |

FOREIGN PATENT DOCUMENTS

| | | |
|---|---|---|
| 0 330 475 A3 | 8/1989 | European Pat. Off. . |
| 0 410 860 A1 | 1/1991 | European Pat. Off. . |
| 0 482 532 A2 | 4/1992 | European Pat. Off. . |
| 0 528 060 A1 | 2/1993 | European Pat. Off. . |
| 27 59 128 C2 | 12/1978 | Germany . |
| WO 91/14229 | 9/1991 | WIPO . |

OTHER PUBLICATIONS

Electronic Design, vol. 42 (Jul. 11, 1994) No. 14, Richard Nass, 40–MBYTE/S Serial Link Poses as an Alternative to SCSI, pp. 46–50.

*Primary Examiner*—Robert B. Harrell
*Attorney, Agent, or Firm*—Hill & Simpson

[57] ABSTRACT

An arrangement has peripheral systems such as disc memory controllers or other device controllers used in the field of data technology. This allows a flexible design in such a manner that it is possible to match the controller designed using the arrangement to desired values in a simple manner in terms of performance, that is the throughput and the response time, failure reliability, the capability for expanding from very small to very large systems and the capability for connection to a large number of host systems (HS). The design is based on a specific combination of serial device buses to form ring circuits (RS) and high-performance buses (SPBP; SPBS), for example parallel buses, for linking relevant data transmission controllers (DS).

12 Claims, 2 Drawing Sheets

ARRANGEMENT FOR THE CONNECTING PERIPHERAL STORAGE DEVICES

BACKGROUND OF THE INVENTION

The invention relates to an arrangement for the connection of peripheral memory devices.

The currently known solutions for arrangements for the connection of peripheral memory devices to higher-level system units are based on large peripheral memory device subsystems which allow matching to desired values with respect, for example, to performance or failure reliability, with the following basic structure.

The memory devices are combined into sub-blocks via device controllers. Within a sub-block, the memory devices are connected in parallel. The device controllers have a plurality of independent connections or, alternatively, multimaster-compatible ports. The number of devices per sub-block is in this case limited, for various reasons, to about 8 to 16.

In a next controller hierarchy, the sub-blocks are jointly allocated to one or more higher-level system controllers. At this hierarchy level, one or more system connections are available to one or more higher-level system units, for example to host systems.

The number of system controllers operating in parallel is always limited to the maximum available number of device controller ports. Owing to the complexity in terms of hardware and wiring for the device controllers which control the ports, this generally leads to the number of ports, and thus to the number of system controllers as well, being limited to four.

A structure as described above is known, for example, from the European reference EP-A-0 528 060, in particular FIGS. 3 and 5.

A disadvantage of this architecture is that even the smallest basic structure generally has the basic complexity for the multiple connection capability. A further disadvantage is the multi-stage concept which necessitates a high level of hardware complexity, complicates the wiring and limits the performance, that is to say the throughput and the response time. Furthermore, the number of memory devices that can be used and the capability for adaptation to more stringent requirements are limited in terms of the system controllers and the system connections.

International reference WO91/14229 discloses an arrangement for the connection of peripheral memory devices, in particular disk memories, to one or more higher-level system units in a data processing system. The connection is made via at least one intermediate data transmission controller. The data transmission controller has control devices for controlling the data interchange between the memory devices as respective sinks or sources and the higher-level system units. The arrangement is based on a tree-like structure. The higher-level system units are connected to a small number of cross-switches, each of which is connected to all the data transmission controllers. One respective data transmission controller is connected to two memory devices. Admittedly, because of the tree-like structure each system unit can communicate with each memory device. However, an increase in the number of memory devices as a rule involves major intervention in the tree structure, since new cross-switches or additional data transmission controllers must be introduced.

SUMMARY OF THE INVENTION

The object of the invention is to specify an arrangement for the connection of peripheral memory devices, in particular disk memories, to one or more higher-level system units in a data processing system of the type mentioned initially, which allows a flexible design in such a manner that it is always possible to match the system to a large number of higher-level system units in terms of performance, failure reliability, connection capability and the capability for expanding from very small to very large memory device subsystems.

In general terms the present invention is an arrangement for the connection of peripheral memory devices, in particular disk memories, to one or more higher-level system units in a data processing system via at least one intermediate data transmission controller which has control devices for controlling the data interchange between the memory devices as respective sinks or sources and the higher-level system units. The memory devices are interconnected to form one or more serially operated device rings. A ring connection of at least one of the data transmission controllers is provided in each device ring. Each data transmission controller has a memory access unit for a common first data memory as a communication and wanted data memory for handling the control of the data interchange between the higher-level system units and the memory devices. Each data transmission controller is designed as an autonomous computer having a control device with associated internal memories and an internal bus system to which computer the memory access unit. All the ring connections linked together and respective system adapters which are provided for signal matching to a respective, connected, higher-level system unit are connected as autonomous units.

Advantageous developments of the present invention are as follows.

A plurality of ring connections for each case is provided where one device ring is provided for each data transmission controller.

In each case one ring connection of all the data transmission controllers is included in each device ring.

The device rings are designed as double rings.

Each memory access unit has an additional memory connection for a second common data memory as a mirror-image data memory for the first common data memory.

Each data memory is connected via parallel bus systems to a respective memory access unit.

The core of the arrangement according to the invention is that the memory devices are interconnected to form one or more serially operated device rings, and a ring connection of at least one of the data transmission controllers is provided in each device ring. The data transmission controllers in this case have control devices for controlling the data interchange between the individual memory devices as respective sinks or sources and the higher-level system units. Any desired number of the data transmission controllers can be fitted in the serially operated device rings since, as a result of the specification of serial operation, signals to be passed through are always reproduced as if new. The device rings also allow retrospective changes to the number of data transmission controllers. The number of connection options to higher-level system units can be varied by the number of data transmission controllers. Since the memory devices are arranged in device rings, it is possible to operate device rings of different sizes at the same time without having to provide the complexity for device locations which are unused but, for example, must be kept in reserve. System failure reliability can furthermore easily be achieved by providing redundant data transmission controllers which are connected to redundant higher-level system units.

Single or duplicated parallel connection can be provided for the connection of one or two data memories, the second of which is used as a mirror-image data memory with respect to the first. If the first data memory fails, it is possible to revert to the mirror-image data memory.

Overall, the described arrangement of a peripheral subsystem allows a flexible design in such a manner that, to a large extent, the system can be matched to desired values in a simple manner in terms of performance, that is to say the throughput and the response time, failure reliability, the capability for connection to a large number of higher-level system units and the capability for expanding from very small to very large systems.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
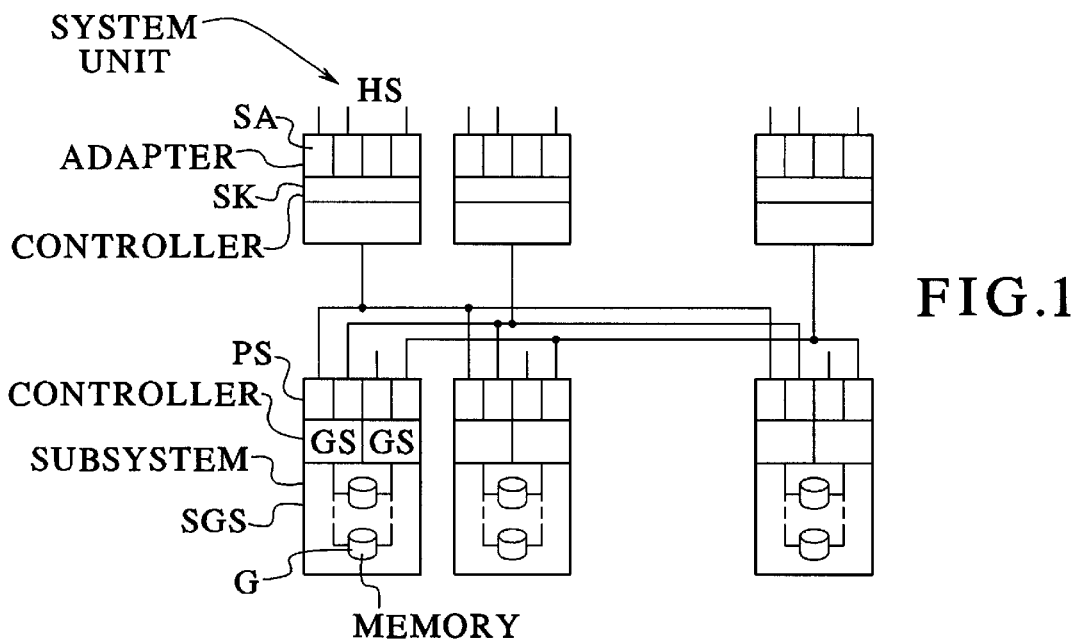
FIG. 1 shows an outline illustration of an arrangement for the connection of peripheral memory devices.

FIG. 1 shows a plurality of peripheral memory device subsystems SGS which are connected via system controllers SK to higher-level system units HS. Memory devices G are combined in groups in the memory device subsystems SGS. According to the exemplary embodiment, disk memories are provided as memory devices G. The memory devices G are connected in parallel within a memory device subsystem.

Host systems, LAN systems or other known systems may be used as higher-level system units. In FIG. 1, in the same way as in FIG. 2, later, it is assumed that the higher-level system units HS are always host systems. The following text therefore no longer refers to higher-level system units HS, but only to host systems HS.

The connection to the host systems HS is made via system controllers SK which have system adapters SA. The host systems HS are connected to one or more system adapters SA. A plurality of system controllers SK operating in parallel allow a plurality of host systems HS to operate in parallel, independently of one another.

The memory devices G, which are combined in groups to form memory device subsystems SGS, are operated by two device controllers GS per group. Each device controller GS is in this case connected to one of two port sides of the memory devices G. Each device controller GS has two ports PS, respectively for incoming and outgoing signals. The respective device controllers GS all have the same number of ports.

One port of a device controller GS is in each case connected in parallel with in each case one port of the other device controllers GS. Each parallel circuit of ports of device controllers GS formed in this way is connected to a system controller SK. The number of system controllers SK operating in parallel is thus limited to the maximum available number of ports of the device controllers GS within a device subsystem SGS.

Figure 2:
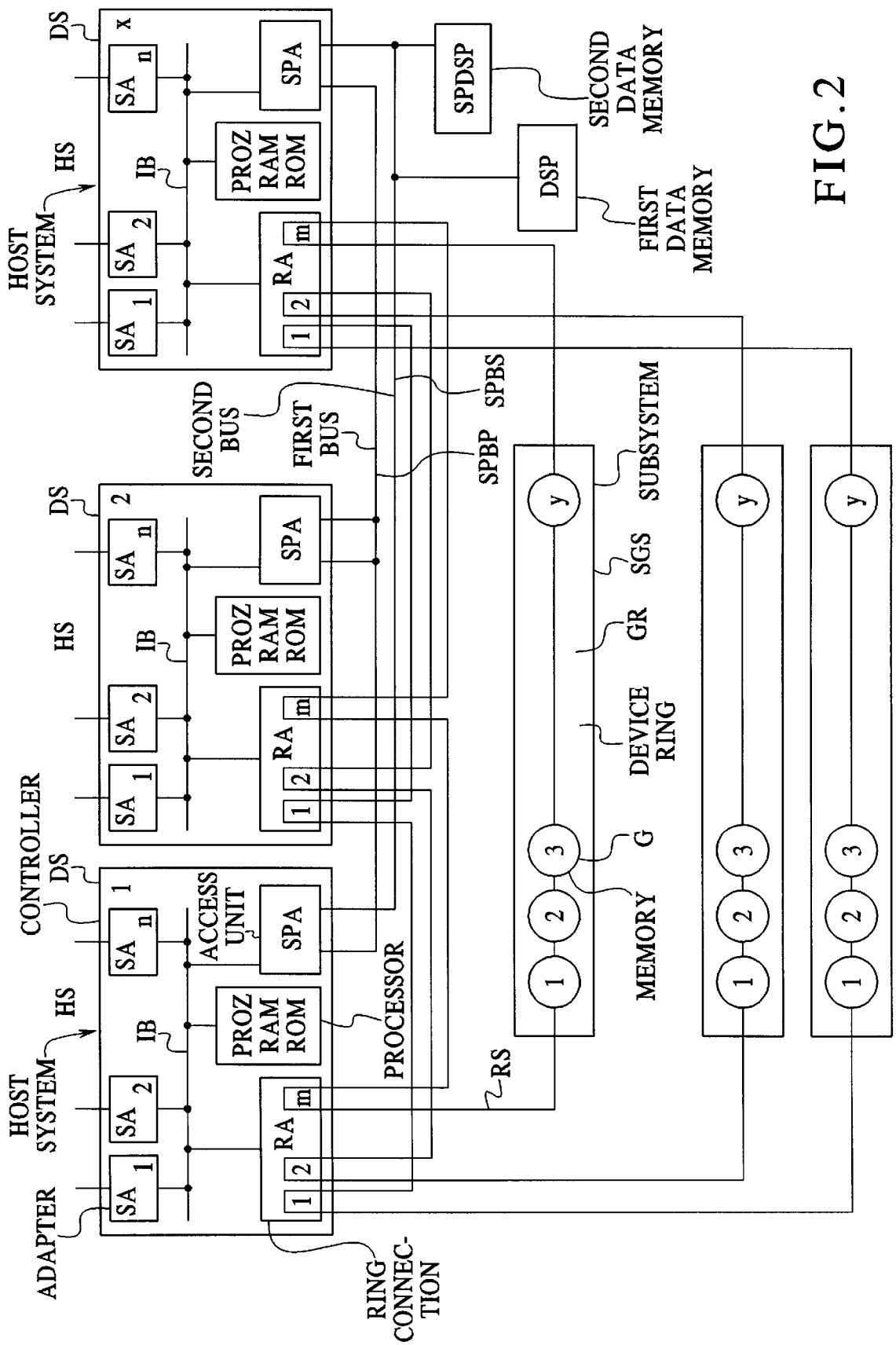
FIG. 2 shows an arrangement for the connection of peripheral memory devices according to the invention.

The design which can be seen in FIG. 2 comprises the following three main complexes:

1. The device rings GR;
2. The data transmission controllers DS, and
3. A first data memory DSP and, optionally, a second data memory SPDSP.

The communication data and wanted data for a memory device cache are stored in the first data memory DSP. A copy of the contents of the first data memory DSP is stored in the second data memory SPDSP. The second data memory SPDSP thus represents a mirror-image data memory for the first data memory DSP, and can be used if the first data memory DSP fails.

The memory devices G which can be connected as a group, for example y disk drives in each case in FIG. 2, are connected to one another in a device ring GR and, once again, represent a device subsystem SGS. Data transmission in the device ring is in serial form. The ring may be designed as a single ring ER (FIG. 3) or, for a fail-safe arrangement, as a double ring DR (FIG. 4). In a double ring DR (FIG. 4), the signals may be passed around the ring in one direction or the other. In a single ring ER (FIG. 3), signals can be passed in only one direction.

A very large number of memory devices G, for example up to several hundred, may be accommodated in one device ring GR. In FIG. 2, these memory devices G are designated 1 to y per memory device subsystem. In a ring structure with serial data transmission, there are no physical problems in driving the system, as is the case, for example, with parallel buses. The interface signals are regenerated after each ring subscriber.

The number of ring subscribers is governed mainly by the ratio of the ring bus bandwidth, for example 20 to 100 Mbyte and the device bandwidth used, for example 4 to 10 Mbyte*10 to 100 inputs/outputs per second. If the bandwidth of a device ring GR is inadequate, then arrangements with a plurality of device rings GR or double rings can be formed. FIG. 2 shows 1 to m device rings.

A plurality of device rings GR are also worthwhile from the point of view of redundant data storage or use of a multiple bandwidth for paralleling accesses.

Data transmission controllers DS are introduced into the device rings GR as necessary. FIG. 2 shows 1 to x data transmission controllers DS and 1 to m device rings GR. Overall, one device ring GR together with the data transmission controllers DS introduced forms in each case one ring circuit RS.

The individual data transmission controllers DS are connected to form the device rings GR by the logic for the ring connections RA. In this case, according to FIG. 2, a plurality of ring connections RA are provided per data transmission controller DS for in each case one device ring GR, and in each case one ring connection RA of all the data transmission controllers DS is arranged in each device ring GR. Each data transmission controller DS thus has access to all the memory devices G in the memory device subsystem SGS. It would also be possible to satisfy only one of the two features mentioned above.

The maximum number of data transmission controllers DS is governed by the interface implementation of the ring bus. The total number of memory devices G and data transmission controllers DS per ring must in this case not exceed the maximum number of subscribers to be operated. As an example, it may be mentioned that this number may be 128.

Two data transmission controllers DS allow complete device access redundancy to be achieved. The number of data transmission controllers DS desired results on the one hand from the desired controller redundancy. Another criterion is the desired performance in memory device subsystem SGS. With the present arrangement, it is therefore possible in a simple manner to determine the performance by adding data transmission controllers DS in a wide bandwidth.

A further criterion for a minimum number of data transmission controllers DS is the requirement to connect the memory device subsystem SGS to different host systems HS.

As already mentioned, the data transmission controller DS is connected to a higher-level system unit HS by system adapters SA. A plurality of system adapters, for example 1 to n, may be used per data transmission controller DS. Different types of system adapters allow different higher-level system units HS to be operated. Examples of known types of system adapters SA include: ESCON (Enterprise System Connection), SCSI (Small Computer System Interface), LAN (Local Area Network) and FCS (Fiber Channel Standard).

The number of system adapters SA required for a host system HS is governed by the desired connection redundancy and the desired performance bandwidth. The performance bandwidth is in turn highly dependent on the type of interface used.

The system adapters SA are connected via an internal bus system IB of the data transmission controller DS to the other modules in the data transmission controller DS.

Another module on the internal bus system IB is, for example, a processor PROZ, to which internal memories RAM, ROM are allocated. The processor PROZ controls the execution of the input/output operations for the data transmission controller DS. In principle, any high-performance processor which offers multiprocessor support may be used for this task.

As the last module mentioned, a memory access unit SPA is connected to the internal bus system IB of the data transmission controller DS. This module produces the connection to a memory access bus, a so-called first bus SPBP or primary bus, which is used jointly by all the data transmission controllers DS. For fail-safe subsystems, there is a second connection to another memory access bus, a so-called second bus SPBS or secondary bus. A first data memory DSP is connected, as a communication and wanted-data memory, to the first bus SPBP. A second data memory SPDSP, as a mirror-image data memory SPDSP with respect to the first data memory DSP, is connected to the second bus SPBS.

The performance of the memory access buses SPBP, SPBS should be several times greater than the performance of the internal bus system IB of a data transmission controller DS. A further aspect governing the design of the memory access buses SPBP, SPBS is the maximum number of data transmission controllers DS on the respective bus.

As a rule, the performance requirements necessitate a high-performance parallel bus in each case.

The access to the communication data and wanted data, which are common to all the data transmission controllers DS is handled via these buses. The data memory for a disk data cache may optionally also be located in this memory area. This has major advantages if the load profiles are very one-sided.

At least the first data memory DSP may advantageously be expanded in stages, in order, for example, to allow necessary customer requirements to be satisfied. The amount of memory may in this case extend from a number of megabytes to a number of gigabytes.

The data memories DSP and SPDSP may be protected against power failure by buffering the supply voltage so that it is independent of the mains.

Figure 3:
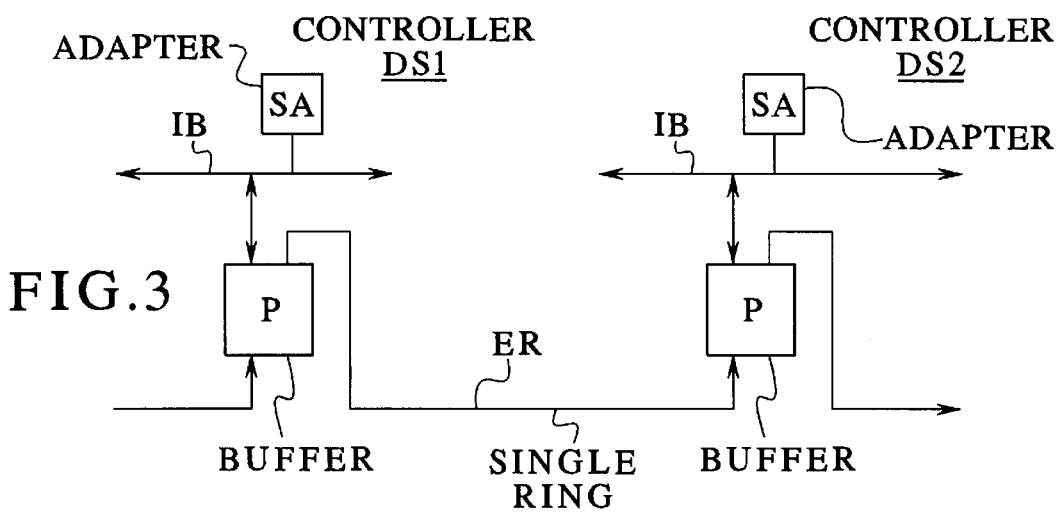
FIG. 3 shows an outline illustration of an exemplary embodiment of a ring connection used in FIG. 2, with single rings.
Figure 4:
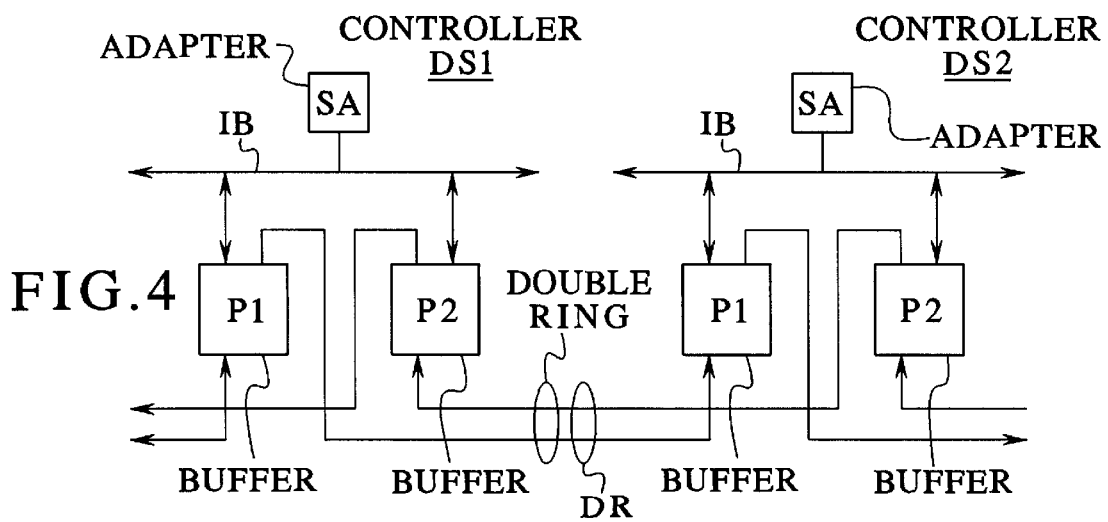
FIG. 4 shows an outline illustration of an exemplary embodiment of a ring connection used in FIG. 2, with double rings.

FIGS. 3 and 4 both show two individual ring connections RA for a first data transmission-controller DS1 and a second data transmission controller DS2. In this case, the implementation of a device ring is based on a single ring ER in FIG. 3, and on a double ring DR in FIG. 4. Single buffers P are used per ring connection RA in FIG. 3. In FIG. 4, double buffers P1, P2 are used respectively for transmitting in one direction or the other. Furthermore, FIGS. 3 and 4 both also show the internal bus system IB and a system adapter SA for each data transmission controller.

The described arrangement, with the combination of wide bandwidth parallel interfaces and serial connections with a large connection capability allows accurate matching to different requirements. The resultant advantages in this case are as follows:

wide scope for device scaling
simple, wide scope for performance scaling
wide scope for the subsystem access scaling to a host system
low complexity for redundant subsystems
single-stage control architecture.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

We claim:

1. An arrangement for connecting peripheral memory devices to at least one higher-level system unit in a data processing system via at least one intermediate data transmission controller which has control devices for controlling data interchange between the memory devices as respective sinks or sources and the at least one higher-level system unit, comprising:

the memory devices interconnected to form at least one serially operated device ring;

the device ring having a ring connection for the at least one intermediate data transmission controller the data transmission controller having a memory access unit for a common first data memory as a communication and wanted data memory for handling control of the data interchange between the higher-level system unit and the memory devices;

the data transmission controller being an autonomous computer having a control device with associated internal memories and an internal bus system to which computer the memory access unit, all ring connections linked together and respective system adapters which are provided for signal matching to a respective, connected, higher-level system unit, are connected as autonomous units.

2. The arrangement as claimed in claim 1, wherein a plurality of ring connections for every device ring are provided for every data transmission controller.

3. The arrangement as claimed in claim 1, wherein a ring connection of all data transmission controllers is included in every device ring.

4. The arrangement as claimed in claim 1, wherein device rings are double rings.

5. The arrangement as claimed in claim 1, wherein every memory access unit has an additional memory connection for a second common data memory as a mirror-image data memory for the first common data memory.

6. The arrangement as claimed in claim 1, wherein every data memory is connected via parallel bus systems to a respective memory access unit.

7. An arrangement for connecting peripheral memory devices, to higher-level system units in a data processing system via at least one intermediate data transmission controller which has control devices for controlling data interchange between the memory devices as respective sinks or sources and the higher-level system units, comprising:

the memory devices interconnected to form serially operated device rings;

each device ring having a ring connection for at least one of the data transmission controllers;

each data transmission controller having a memory access unit for a common first data memory as a communication and wanted data memory for handling control of the data interchange between the higher-level system units and the memory devices;

each data transmission controller being an autonomous computer having a control device with associated internal memories and an internal bus system to which computer the memory access unit, all ring connections linked together and respective system adapters which are provided for signal matching to a respective, connected, higher-level system unit, are connected as autonomous units.

8. The arrangement as claimed in claim 7, wherein a plurality of ring connections for one device ring are provided for each data transmission controller.

9. The arrangement as claimed in claim 7, wherein one ring connection for all the data transmission controllers is included in each device ring.

10. The arrangement as claimed in claim 7, wherein the device rings are double rings.

11. The arrangement as claimed in claim 7, wherein each memory access unit has an additional memory connection for a second common data memory as a mirror-image data memory for the first common data memory.

12. The arrangement as claimed in claim 7, wherein each data memory is connected via parallel bus systems to a respective memory access unit.

* * * * *